United States Patent Office 3,450,752
Patented June 17, 1969

3,450,752
METHODS FOR PREPARING SOLID SALTS OF AMINO ACIDS
Petrus A. Inklaar, Schalkhaar, Diepenveen, Netherlands, assignor to Vasco Industries Corp., New York, N.Y., a corporation of New York
No Drawing. Filed June 3, 1966, Ser. No. 555,009
Claims priority, application Netherlands, June 4, 1965, 6507108
Int. Cl. C07c 99/00, 101/04
U.S. Cl. 260—534          8 Claims

ABSTRACT OF THE DISCLOSURE

Solid hydrated alkali metal salts of amino acids such as glycine, glutamic acid, beta-alanine, lysine, etc., are prepared with high yields by intimately contacting fine particles of amino acid and of NaOH or KOH in substantially dry solid state at reaction temperatures below the melting and decomposition temperatures of the amino acid. The reaction may be initiated by heating a mixture of powders, by grinding solid amino acid with solid hydroxide, or by contacting powders at room temperature in the use of KOH. A solid mass produced by reaction heat can be ground after cooling to form a powder of the hydrated amino acid salt.

---

Salts of amino acids, especially alkali salts of glycine and alanine, are used on a technical scale in absorption liquids for removing acid components such as carbon dioxide and hydrogen sulfide from gases. Such gases may come from refineries for oil processing, natural gas plants, coke ovens and others. Up till now such components for absorption liquids were marketed in solution.

Salts of amino acids are used in buffers to maintain the pH of aqueous liquids at a constant level.

Also in foods amino acids and their salts find important applications.

One may prepare solid salts, for instance sodium glycinate, by bringing together glycine and sodium in absolute alcohol. This is a tedious and expensive method. When dissolving glycine in sodium hydroxide solution one obtains sodium glycinate but its isolation is expensive and takes much time caused by the very high solubility of the sodium salt so that with careful evaporation in vacuo a thick syrup is formed which is difficult to crystallize.

It is an object of the invention to provide a process and a method for preparing solid salts of amino acids in a simple and efficient way with high yields.

More specifically it is an object of the invention to prepare such solid amino acid salts that may contain one molecule of hydrate water.

Even more specifically it is an object of the invention to provide a method for preparing the solid alkali salts of amino acids in such a way that none or only very little heating is needed to obtain such salts from the reacting components.

According to the invention it was found that alkali salts of amino acids which may or may not be substituted, and which can contain at least one molecule of water of crystallization, may be obtained in a very simple way in a nearly one hundred percent yield by heating a finely divided solid oxide or preferably a finely divided hydroxide in a mixture with a finely divided solid amino acid or in some cases by simply leaving alone without heating such a mixture. Besides solid salts one may prepare in this way also solid mixtures of amino acid and amino acid salt. Instead of pure amino acid one may also use mixtures of amino acids for example the amino acid mixtures one obtains from careful hydrolysis of proteins. Alkali salts of glycine were very easily obtained in this way and showed 0.8 to 1.0 mol bound water in the dry condition. It goes without saying that one may remove the hydrate water from the salts prepared in the above described way with water removing agents or by heating, possibly under reduced pressure. When using glycine a small amount of ammonia developed during the heating process with solid NaOH or KOH but this ammonia appeared to be formed by the decomposition of ammonium chloride that is normally present in a very small quantity in glycine especially if the latter has been prepared from monochloroacetic acid. After the reaction the salt contained a small amount of sodium chloride but it was totally free of ammonium chloride. When using the amino acid salt in foods this purification from ammonium chloride is a big advantage and the vegetable or animal organism can stand without any objection a small amount of sodium chloride.

The subdivision of the components may be to particle sizes of one micron to granules of 1000 or even more microns depending on the reactivity of the mixture. Substituents of the amino acids may be those as occurring in the decomposition products of proteins, or alkyl, alkenyl, or aryl groups.

The invention is elucidated by the following examples but is not restricted thereto:

EXAMPLE I 75 grams of air dry glycine were mixed with 40 grams powdered sodium hydroxide. This mixture was heated while agitated in a water bath.

The temperature of the mixture rose slowly to 60° C. without any visible reaction. At 61° C. the mixture suddenly changed into a sandy mass which made further stirring extremely difficult. There was also a substantial heat development. The temperature rose to 68–70° C. and a highly viscous mass was formed. This mass when left alone gradually became a stonehard cake which after some twelve hours could be ground to an airdry product consisting of sodium glycinate with 0.9 mol water per mol of glycinate.

A similar product was obtained if the heating was continued till 100° C., in which case a rather thin liquid was formed which after cooling also gradually solidified into a hard mass. Here 0.85 mol water per mol of glycinate was found.

EXAMPLE II 75 grams glycine were mixed with 20 grams sodium hydroxide. On heating the structure of the powder suddenly changed at about 60° C. and some ammonia was split off. At 62° C. the mass became very viscous and the temperature rose as a result of heat development.

The viscous mass was poured on a flat plate and changed in some hours into a brittle mass which could easily be cut into smaller pieces. After 2 hours these pieces were stonehard and could be ground. A mixture of sodium glycinate 1 aq. and glycine was formed.

EXAMPLE III 56 grams KOH powder were mixed with 75 grams powdered glycine. Immediately some ammonia was formed and the temperature rose to 38° C. On heating to 40° C. a liquid mass was formed. After cooling this mass could be ground to a dry powder.

EXAMPLE IV 29.4 grams glutamic acid were powdered and thoroughly mixed with 8 grams NaOH powder. After one hour heating at 80° C. the mixture was left at room temperature and so a rather hard mass of crystals was formed which was ground to a dry powder.

EXAMPLE V 89.1 grams beta-alanine were mixed with 40 grams NaOH and then the mixture was ground to a fine powder. With heat development the sodium salt of beta-alanine was formed which was removed from the grinder as a fine powder.

EXAMPLE VI 146 grams lysine were mixed with 40 grams NaOH. Both components were in the form of a fine powder. The mixture was heated to 70° C. and kept at this temperature during 30 minutes. After 24 hours' standing at room temperature a solid mass of the sodium salt of lysine was obtained which on analysis appeared to contain 0.6 mol water per mol of sodium lysinate. Similar results were obtained if the lysine was replaced by 174 grams asparagine, 121 grams cysteine, 146 grams glutamine or 155 grams histidine. Phenylalanine, methionine and valine gave similar results with somewhat lower yields (around 95%).

Calcium, magnesium and even aluminium salts were obtained in the same way from the hydroxides and the free amino acids.

What is claimed is:

1. A method of preparing a solid hydrated alkali metal salt of an amino acid, which comprises intimately contacting finely divided particles of an amino acid with finely divided particles of sodium or potassium hydroxide at a temperature below the melting and decomposition temperatures of the amino acid yet at which the amino acid particles will react with the hydroxide particles, each of the reactants being in a substantially dry solid state, and continuing said contacting until said salt is formed.

2. A method according to claim 1, said contacting being continued until the reaction between said particles is substantially complete and a coherent solid reaction mass is formed, and then cooling said mass and grinding it into a powder of said salt.

3. A method according to claim 1, the sizes of said particles being in the range of from 1 to 1000 microns.

4. A method according to claim 1, said contacting and the reaction of said particles being effected by grinding a mixture of the amino acid and the hydroxide.

5. A method according to claim 1, said amino acid particles being powdered glycine and said hydroxide particles being powdered sodium hydroxide, and the reaction being initiated by heating an intimate mixture of said particles to a temperature between 55° and 65° C.

6. A method according to claim 1, said amino acid particles being powdered glycine and said hydroxide particles being powdered potassium hydroxide, the reaction being initiated by intimately contacting said particles at room temperature.

7. A method according to claim 1, said amino acid particles being powdered glutamic acid and said hydroxide particles being powdered potassium hydroxide, and the reaction being initiated by heating an intimate mixture of said particles to at least about 60° C.

8. A method according to claim 1, said amino acid being beta-alanine and the reaction being effected by heating an intimate mixture of said particles to at least 60° C.

References Cited

UNITED STATES PATENTS

| 2,584,731 | 2/1952 | Ogawa | 260—534 |
| 2,791,606 | 5/1957 | Novak et al. | 260—534 XR |
| 3,365,488 | 1/1968 | Fernholz et al. | 260—526 |

LORRAINE A. WEINBERGER, *Primary Examiner.*

ALBERT P. HALLUIN, *Assistant Examiner.*

U.S. Cl. X.R.

260—309, 448, 518